(12) United States Patent
Cooper et al.

(10) Patent No.: US 8,295,960 B2
(45) Date of Patent: Oct. 23, 2012

(54) LOAD MANAGEMENT CONTROLLER FOR A HOUSEHOLD ELECTRICAL INSTALLATION

(76) Inventors: Timothy Patrick Cooper, Dun Laoghaire (IE); Colin David Harris, Rathfarnham (IE); Thomas Laurence Bean, Dun Laoghaire (IE)

( * ) Notice: Subject to any disclaimer, the term of this patent is extended or adjusted under 35 U.S.C. 154(b) by 115 days.

(21) Appl. No.: 12/596,048

(22) PCT Filed: Apr. 17, 2008

(86) PCT No.: PCT/EP2008/054696
§ 371 (c)(1),
(2), (4) Date: Apr. 26, 2010

(87) PCT Pub. No.: WO2008/125697
PCT Pub. Date: Oct. 23, 2008

(65) Prior Publication Data
US 2010/0235010 A1    Sep. 16, 2010

(30) Foreign Application Priority Data

Apr. 17, 2007 (IE) .................................. S2007/0278
Aug. 3, 2007 (IE) .................................. S2007/0557
Feb. 14, 2008 (IE) .................................. S2008/0111

(51) Int. Cl.
*G06F 19/00* (2011.01)
(52) U.S. Cl. .......................................... 700/96; 700/295
(58) Field of Classification Search .................. 700/96, 700/295, 286; 705/412
See application file for complete search history.

(56) References Cited

U.S. PATENT DOCUMENTS

| 5,576,700 | A | * | 11/1996 | Davis et al. ................... 340/3.31 |
| 6,118,269 | A | * | 9/2000 | Davis ............................. 324/110 |
| 7,130,807 | B1 | * | 10/2006 | Mikurak ...................... 705/7.25 |
| 2006/0190139 | A1 | | 8/2006 | Reaume |
| 2006/0259199 | A1 | * | 11/2006 | Gjerde et al. ................. 700/284 |
| 2006/0276938 | A1 | | 12/2006 | Miller |
| 2008/0133067 | A1 | * | 6/2008 | DeMay ............................. 701/1 |

FOREIGN PATENT DOCUMENTS

| EP | 1372238 A1 | 12/2003 |
| EP | 1571745 A1 | 9/2005 |
| WO | 2007014424 A1 | 2/2007 |

OTHER PUBLICATIONS

International Search Report, dated Oct. 15, 2008, received in international patent application No. PCT/EP2008/054696, 3pgs.

* cited by examiner

*Primary Examiner* — Kidest Bahta
(74) *Attorney, Agent, or Firm* — Holland & Knight LLP; Brian J. Colandreo, Esq.; Jeffrey T. Placker, Esq.

(57) ABSTRACT

This invention relates to a load management controller for a household electrical installation comprising a plurality of electrical sub-circuits. The electrical sub-circuits may each comprise a plurality of components, a single component or a part of a single component. A plurality of the electrical sub-circuits have electricity usage profiles containing rules determining the supply of electricity to the electrical sub-circuit. The load management controller has access to the electricity usage profiles of the electrical sub-circuits and controls the supply of electricity to the electrical sub-circuit in accordance with the electricity usage profile related to that electrical sub-circuit. The household electrical installation may comprise a rechargeable battery bank or supply that may be used to provide power to the household electrical installation.

19 Claims, 5 Drawing Sheets

LOAD MANAGEMENT CONTROLLER FOR A HOUSEHOLD ELECTRICAL INSTALLATION

RELATED APPLICATIONS

The subject application is a U.S. National Stage application that claims the priority of International Application No. PCT/EP2008/054696, filed on 17 Apr. 2008, which claims the priority of Irish National Application Nos.: S2007/0278, filed on 17 Apr. 2007; S2007/0557, filed on 3 Aug. 2007 and S2008/0111, filed on 14 Feb. 2008, the contents of which are herein incorporated by reference in their entirety.

This specification relates to a load management controller for a household electrical installation.

The widespread availability and use of electrical fittings and components has resulted in electricity becoming one of the main forms of energy used in households. The amount of electricity consumed by these fittings and components varies enormously from time to time. If all the electrical fittings and components in a typical household are switched on at the same time the total electrical load in the household would be in the region of 10,000 Watts. As only a small proportion of these fittings and components are required at the same time the actual electrical load at any one time is normally a small proportion of this, typically in the region of 500 Watts, or 5% of the total potential load. This actual load increases dramatically when large current items such as heating elements in cookers, kettles, electric irons, washing machines, immersion heaters, space heaters and the like are switched on. The resulting actual load typically consists of a "base" or continuous load in the region of 5% of the maximum possible load and a series of large loads of relatively short duration. Therefore, the electrical plant generating and supplying the typical household must be capable of supplying up to 10,000 Watts but is usually required to supply between 300 and 3,000 Watts at any given time.

The load characteristic in commercial and industrial buildings is slightly different because these activities tend to be of a more predictable and continuous nature, with most plant, fittings and equipment operating throughout the working day. The electrical load in these buildings follows a more predictable pattern. Typically, the base load in a commercial building is in the region of 25% of the normal operating load. The normal operating load starts at approximately 8.00 am and ends at approximately 6.00 pm, typically on working days only.

All of these individual loads, from households, commercial and industrial buildings, are met from a single transmission/distribution network or grid that is powered by a number of large generating stations. The resulting total load on the national grid represents the combination of all the individual loads served by the grid—i.e. households, commercial buildings, industrial buildings and so on. Due to the fact that the total load on the grid can vary greatly over time, this leads to inefficiencies in the operation of the grid. This occurs when the generating and transmission plant that is necessarily sized to meet peak loads is operating at part load. Under these circumstances system losses and capital and maintenance costs, which are related to the size of the plant, represent a very much greater proportion of the delivered power and value than is the case when the plant is operating at full load. The addition of wind, tidal current and wave powered generating stations to the grid whose varying outputs are determined by nature is adding further to the uncontrollability and inefficiency of the grid.

The practices described above are considered by many to be hugely inefficient because the inability to control and manage individual loads is resulting in low generation and transmission/distribution plant utilisation, low economic return and low operating efficiency. The consequences of this include high fuel consumption, high cost of electricity and high associated emissions. In addition to this, there is increasing concern about the effect on climate caused by emissions resulting from the burning of fossil fuels in electricity generating stations. Also, the cost of fossil fuel is expected to continue increasing rapidly because fossil fuel production rates have peaked. The cost of electricity is expected to increase correspondingly.

It is now recognised that a coherent energy storage and use strategy is required to counter these negative economic and environmental effects. Coherent storage and use of electricity in the household is a critically important element of this strategy. Heretofore, very few households have implemented a coherent strategy of this nature. In this specification the term "household" has been used to denote both permanent and temporary residences typically occupied by people including houses, apartments, flats and other dwellings.

It is known for electricity providers and grid operators to provide incentives to consumers to use electricity at times other than the traditional peak times in order to spread the demand for the electricity more evenly over a 24 hour period. Heretofore, these incentives have been directed mainly towards commercial and industrial consumers where capacity, demand and time based tariffs are available and where discounts are given for supplies that can be interrupted by the providers in certain circumstances, for example during periods of exceptionally high demand or plant outages. The incentives applying to households have, by and large, consisted of day/night type dual tariffs aimed at encouraging households to reduce electricity consumption during the day and to increase electricity consumption during the night.

In recent years, thought has been given to the use of more complex time based import and export tariffs intended to encourage household customers to reduce or increase electricity consumption during certain periods, and where local storage of electricity is possible in storage devices such as battery banks, electric vehicles with rechargeable battery packs, capacitors and the like, to charge or discharge the storage devices during certain periods. Where electricity storage devices are connected directly to the main household circuit or the grid by means of approved inverter type devices, the discharged electricity can, in certain circumstances, be used to provide power that is exported from the household to the National grid.

The approach adopted in this regard by Network operators has been to provide/install a new type of household meter, commonly know as a smart meter, that will be used to log, record and transmit time based import and export data for each smart metered household to a central server and to pass on this data to providers and purchasers of electricity so that they can charge and pay the household customers accordingly. This provides a sound financial basis for rewarding households that import and export electricity in a way that helps the electricity providers and grid operators to optimise the operation of their plant but does not provide a method for optimising the import and export of electricity accordingly.

It is desirable to provide such a method and device in the form of a load management controller that optimises the import and export of electricity in a household in a way that helps electricity providers and grid operators to optimise the operation of their plant and enables the householder to avail of related incentives, such as variable time-based import and export tariffs, where they exist. It is also desirable to provide a load management controller that uses the same control technology to minimise electricity consumption in a household by switching non-essential devices off when they are not required.

It is an object of the present invention to provide a load management controller for a household electrical installation that overcomes at least some of these problems.

STATEMENTS OF INVENTION

According to the invention there is provided a load management controller for a household electrical installation, the household electrical installation comprising a plurality of electrical sub-circuits supplied by an electricity power supply, each of the electrical sub-circuits having an electricity usage profile containing rules determining the supply of electricity to the electricity sub-circuit associated therewith, the load management controller comprising means to access the electricity usage profiles and means to control supply of electricity to the electrical sub-circuits having an electricity usage profile in accordance with the rules of the electricity usage profile for that electrical sub-circuit.

In another embodiment of the invention there is provided a load management controller in which the load management controller has accessible memory and the usage profiles are stored in load management controller accessible memory.

In a further embodiment of the invention there is provided a load management controller in which the accessible memory is programmable and the load management controller has a user interface to allow programming of the electricity usage profiles in accessible memory.

In one embodiment of the invention there is provided a load management controller in which the user interface comprises a data communication port. Alternatively, the user interface comprises a keypad.

In a further embodiment of the invention there is provided a load management controller in which the means to control supply of electricity to the electrical sub-circuits further comprises a controllable switch, responsive to the load management controller, intermediate the electricity power supply and the electrical sub-circuit having an electricity usage profile. Alternatively, the means to control supply of electricity to the electrical sub-circuits further comprises a thyristor. In a further alternative, the means to control supply of electricity to the electrical sub-circuits further comprises a speed controller.

In one embodiment of the invention there is provided a load management controller in which the load management controller comprises a receiver to receive data from a remote electricity power supply and/or electricity grid operator. In another embodiment of the invention there is provided a load management controller in which the load management controller comprises a transmitter to transmit data to a remote electricity power supply operator and/or grid operator.

In a further embodiment of the invention there is provided a load management controller in which the load management controller has means to export electricity from a rechargeable battery bank onto an electricity supply grid.

In one embodiment of the invention there is provided a load management controller in which the load management controller exports the electricity from the rechargeable battery bank to the electricity supply grid in response to a request for electricity received from a remote electricity power supply operator and/or grid operator. This request may be expressed in the form of a varying time-related tariff for the exported power or in the form of a signalled real-time request to export power. It is probable that the varying time-related tariff will apply for specific periods of the week and/or year and will be revised from time to time.

In another embodiment of the invention there is provided a load management controller in which the load management controller further comprises a meter to measure the amount of electricity exported onto the electricity supply grid.

In a further embodiment of the invention there is provided a load management controller in which the rules of the electricity usage profile for the electrical sub-circuits are one or more of time-of-day rules, activity related rules, proximity related rules, cost of electricity supply rules and operator determined rules. Furthermore, the rules could be occupancy rules.

In one embodiment of the invention there is provided a load management controller in which in the case of a plurality of rules being provided for an electrical sub-circuit the rules are based in a hierarchical format according to their level of seniority.

In another embodiment of the invention there is provided a load management controller in which one of the electricity sub-circuits comprises a rechargeable, static battery bank operable as an alternative power supply to the remaining electrical sub-circuits in the household electrical installation.

In a further embodiment of the invention there is provided a load management controller comprising means to select one of the rechargeable static battery bank and a grid power supply to provide power to one or more of the remaining electricity sub-circuits.

In another embodiment of the invention there is provided a load management controller in which one of the electrical sub-circuits comprises a rechargeable battery in an electric vehicle. The rechargeable battery can be temporarily connected to the household electrical installation and controlled and used in the same way as the rechargeable static battery bank referred to above.

In one embodiment of the invention there is provided a load management controller comprising a plurality of controller units distributed throughout the household electrical installation in one or more of individual sockets, switches and electrical components and a central communications unit, the plurality of controller units having means to receive and transmit communications to the central communications unit in the household electrical installation. These distributed units operate in combination with each other with the same load management effect as a single centrally located load management controller.

In another embodiment of the invention there is provided a household electrical installation comprising a plurality of electrical sub-circuits supplied by an electricity power supply, each of the electrical sub-circuits having an electricity usage profile containing rules determining the supply of electricity to the electrical sub-circuit associated therewith, the household electrical installation comprising a load management controller having access to each of the electricity usage profiles, the load management controller having means to control the supply of electricity to the electricity sub-circuits in accordance with the rules of the electricity usage profile of the electrical sub-circuits.

In a further embodiment of the invention there is provided a household electrical installation in which the means to control the supply of electricity further comprises one of a controllable switch, a thyristor and a controllable motor.

In one embodiment of the invention there is provided a household electrical installation in which one of the electricity sub-circuits comprises a rechargeable static battery bank operable as an alternative power supply to the remaining electrical sub-circuits in the household electrical installation.

In another embodiment of the invention there is provided a household electrical installation in which one of the electricity sub-circuits comprises a rechargeable battery bank in an electric vehicle operable as an alternative power supply to the remaining electrical sub-circuits in the household electrical installation.

In a further embodiment of the invention there is provided a household electrical installation in which the load management controller comprises means to select one of a rechargeable static battery bank, a rechargeable battery bank in an electric vehicle and a grid power supply to provide power to one or more of the remaining electrical sub-circuits.

In one embodiment of the invention there is provided a household electrical installation in which the load management controller has means to communicate with a remote electricity power supply operator.

In another embodiment of the invention there is provided a household electrical installation in which the household electrical installation has means to export electricity from a rechargeable battery bank onto an electricity supply grid.

DETAILED DESCRIPTION OF THE INVENTION

The invention will now be more clearly understood from the following description of some embodiments thereof, given by way of example only, in which:—

Figure 1:
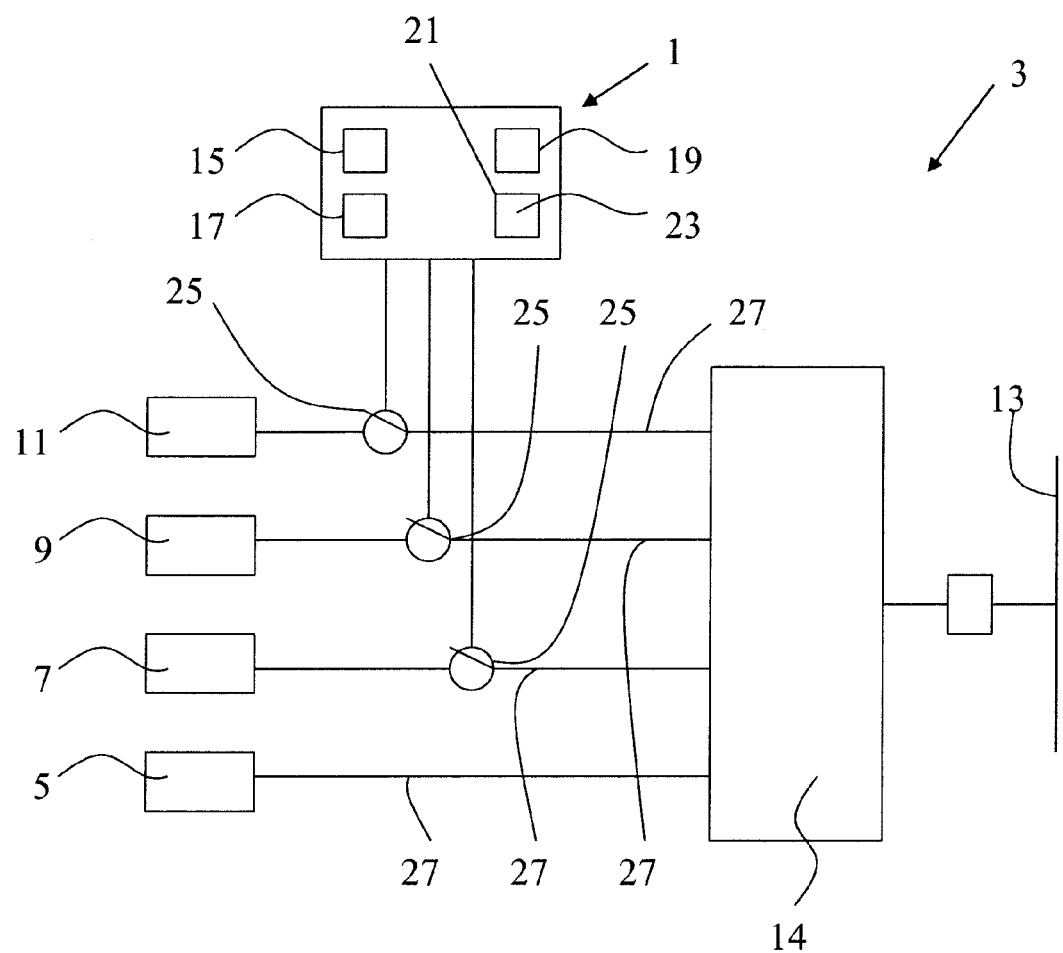
FIG. 1 is a diagrammatic representation of a load management controller in a household electrical installation.

Referring to the drawings and initially to FIG. 1 thereof there is shown a load management controller, indicated generally by the reference numeral 1, for a household electrical installation, indicated generally by the reference numeral 3. The household electrical installation 3 comprises a plurality of electrical sub-circuits, 5, 7, 9, 11 supplied by an electricity power supply 13 via a main panel 14. At least some of the electrical sub-circuits, 5, 7, 9, 11 have an electricity usage profile (not shown) containing rules determining the supply of electricity to that electrical sub-circuit.

The load management controller 1 comprises means, in this instance processor 15, to access the electricity usage profiles and means 17 to control supply of electricity to the electrical sub-circuits, 5, 7, 9, 11 having an electricity usage profile in accordance with the rules of the electricity usage profile for that electrical sub-circuit. The load management controller 1 further comprises a programmable accessible memory 19 and a user interface 21. The user interface 21 in turn comprises a data communication port 23. Alternatively, the user interface could comprise a keypad (not shown). The household electrical installation 3 further comprises a plurality of controllable switches 25 responsive to the means 17 of the load management controller 1. The switches 25 are each located in an electrical power supply cable 27 intermediate the electricity power supply 13 and the electrical sub-circuit 5, 7, 9, 11 having an electricity usage profile.

In use, the load management controller 1 controls supply of electricity to each of the electricity sub-circuits 5, 7, 9, 11, having an electricity usage profile associated therewith. For example, by opening or closing switch 25 intermediate electricity sub-circuit 7, 9, 11 and power supply 13, the electricity supply to the electricity sub-circuit 7, 9, 11 is controlled. Electricity sub-circuit 5 may relate to a central service such as an alarm and is to be supplied electricity at all times. On the other hand, electricity sub-circuit 7 may be a circuit having equipment such as various pumps or lighting units that would not necessarily need to be on at certain times during the night. Therefore it is advantageous to cut supply to those circuits during certain periods. Electricity sub-circuit 9 may be a circuit comprising equipment such as washing machines, dish-washers and other equipment that may avail of cheaper electricity tariffs. With this circuit, it is preferable to allow electricity to be supplied to this circuit at low tariff periods only and electricity is prevented from being supplied to that circuit during other periods by opening the switch 25 intermediate the circuit 9 and the power supply 13. Electricity sub-circuit 11 may be an occupancy related circuit, such as a non-essential lighting circuit, which if there are no occupants in the building or in that part of the building or if the occupants in the building are asleep, the device on this circuit is kept off.

Figure 2:
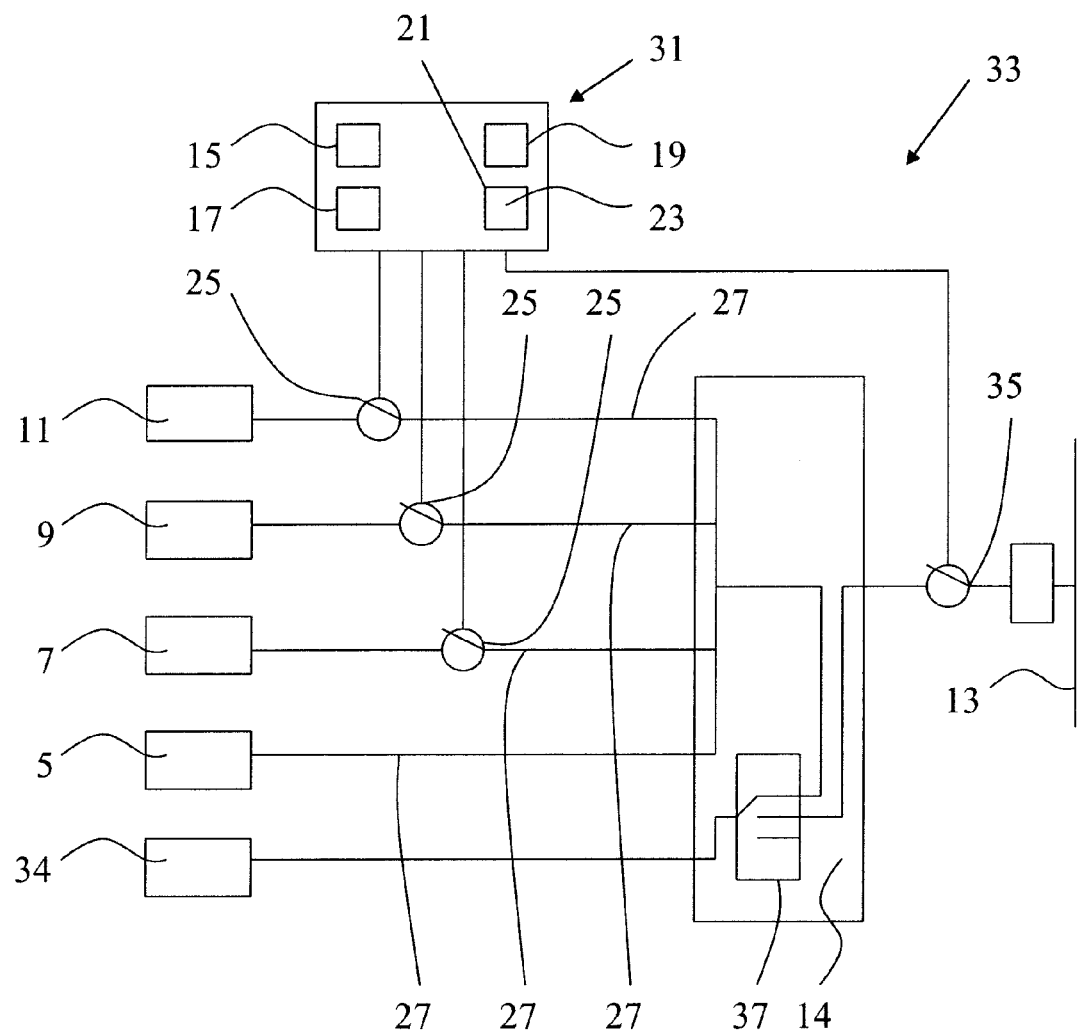
FIG. 2 is a diagrammatic representation of a load management controller in an alternative household electrical installation.

Referring to FIG. 2 there shown a load management controller indicated generally by the reference numeral 31 for a household electrical installation, indicated generally by the reference numeral 33, where like parts have been given the same reference numeral as before. The household electrical installation 33 comprises a further electrical sub-circuit 34 comprising a rechargeable static battery bank. The rechargeable static battery bank 34 is fed from the main panel 14 and the load management controller controls the flow of electricity to the static battery bank 34 in accordance with an electricity usage profile including rules determining the supply of electricity to the static battery bank. The household electrical installation 33 further comprises a switch 35 operable by the load management controller to disconnect the grid supply from the main panel and a switch 37 operable by the load management controller in the main panel routing electricity to and from the static battery bank.

In use, the rechargeable static battery bank 34 is operable as an alternative power supply to the remaining electrical sub-circuits 5, 7, 9, 11, in the household electrical installation. The switch 37 is provided to connect the rechargeable battery bank to the grid 13, to the remaining sub-circuits 5, 7, 9, 11 or to isolate the static battery bank. In this way, it is envisaged that the rechargeable static battery bank may be charged up by connecting it to the grid 13 during times where the cost of electricity is relatively low such as at low load times during the middle of the night for example. Then when the cost of electricity is relatively high such as at peak times during the day, the static battery bank may be used as an alternative power supply to the remaining electrical sub-circuits 5, 7, 9, 11 in the household electrical installation by switching the switch 37 to connect the electricity power supply to the remaining electrical sub-circuits. The switch 35 may be used to disconnect the grid supply altogether from the electrical sub-circuits or alternatively the grid 13 may be used to augment the power coming from the static battery bank 34 and therefore the power from the static battery bank is used first of all by the electrical sub-circuits 5, 7, 9, 11 and when that power is dissipated the power necessary to operate the electrical sub-circuits may be drawn from the grid supply.

A rectifier/charge controller (not shown) would be provided to convert the electricity supplied to the battery bank from the grid and an inverter (not shown) would be provided to convert the electricity delivered from the battery bank to the electrical sub-circuits. The rectifier/charge controller and inverter have been omitted from the drawing for clarity and it would be understood that these would be provided. The rectifier/charge controller AC/DC device is an AC powered charge controller. As the AC current is simply rectified and delivered to the battery there is no need for an inverter here. The charge rate is determined by the amount of power available at any one time and the battery characteristics. The charge controller adjusts the charge rate accordingly in conjunction with the load management controller. The discharge rate is determined by the state of charge of the battery, the battery characteristics and the demand. The inverter will control this accordingly in conjunction with the load management controller. In this way electricity from a relatively inexpensive source is used to power the electrical sub-circuits. The load management controller will control the rate of charge and discharge of the battery using a suitable charge/discharge controller.

Figure 3:
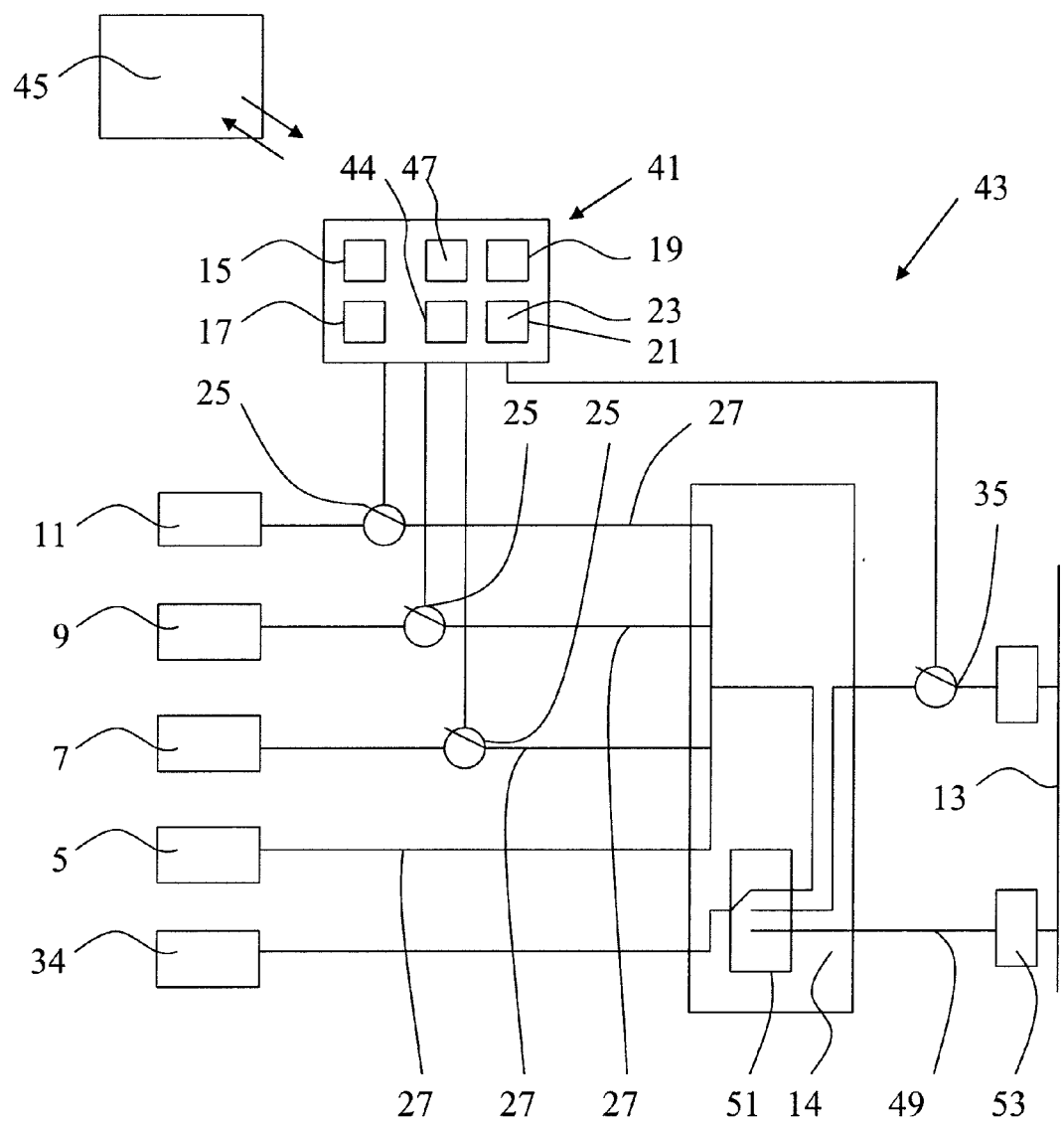
FIG. 3 is a diagrammatic representation of a load management controller in a further alternative household electrical installation.

Referring to FIG. 3 there shown a further still alternative embodiment of load management controller according to the present invention indicated generally by the reference numeral 41, for a household electrical installation 43, where like parts have been given the same reference numeral as before. The load management controller 41 comprises a receiver 44 to receive data from a remote electricity power supply operator 45. The load management controller 41 further comprises a transmitter 47 to transmit data to a remote electricity supply operator 45. The rechargeable static battery bank 34 is connectable to the grid via cable 49 and switch 51. There is further provided a meter 53 intermediate the static battery bank 34 and the grid supply and a meter 12 intermediate the grid and the main board.

In use, the load management controller 41 is in communication with the remote electricity power supply operator 45 and receives requests from the remote electricity power supply operator 45 for electricity to be supplied back to the grid from the rechargeable battery bank 34. If the load management controller 41 has excess electricity in the battery bank 34 that is not required by the sub-circuits 5, 7, 9, 11, the load management controller can activate switch 51 so that electricity is supplied back to the grid 13 via the cable 49 from the battery bank 34. The load management controller will attempt to reduce the electricity being consumed in the household to enable available excess electricity to be supplied back to the grid.

In this way, at times of excessive load on the grid, the grid operator may pole various load management controllers in households that may have electricity stored in their battery banks to supply that electricity back out onto the grid. The meter 53 is provided on the cable 49 to measure the amount of electricity exported back onto the electricity supply grid. In the communication from the electricity power supply operator 45 to the load management controller 41, the electricity power supply operator 45 may include price information of the amount they are willing to pay for the electricity and the load management controller 41 may make decisions based on the price being offered by the electricity power supply operator for the electricity as to whether or not they wish to supply power back to the grid 13 via the cable 49 from the rechargeable battery bank. In such a scenario, it is envisaged that the load management controller 41 may store electricity in the rechargeable static battery bank 34 at times when the electricity tariff is low. When the electricity tariff is high and the electricity power supply operator 45 requires electricity to be supplied back to the grid, the load management controller may sell the electricity from the static battery bank 34 back to the grid at a higher price than they originally purchased it for thereby earning more for the electricity than they paid for it. This will help reduce bills of the household for electricity significantly.

Instead of the load management controller communicating directly with the grid operator, the load management controller could be in communication with a smart meter if one is installed in place of meter 12. The smart meter may have data such as information relating to tariffs from the grid operator or electricity provider stored thereon or indeed the smart meter could be in communication with the grid operator or electricity provider. If the smart meter is in communication with the grid operator or the electricity provider, the information can be relayed to the load management controller by the smart meter. Similarly, meter 53 could be a smart meter in communication with the load management controller and grid operator.

Figure 4:
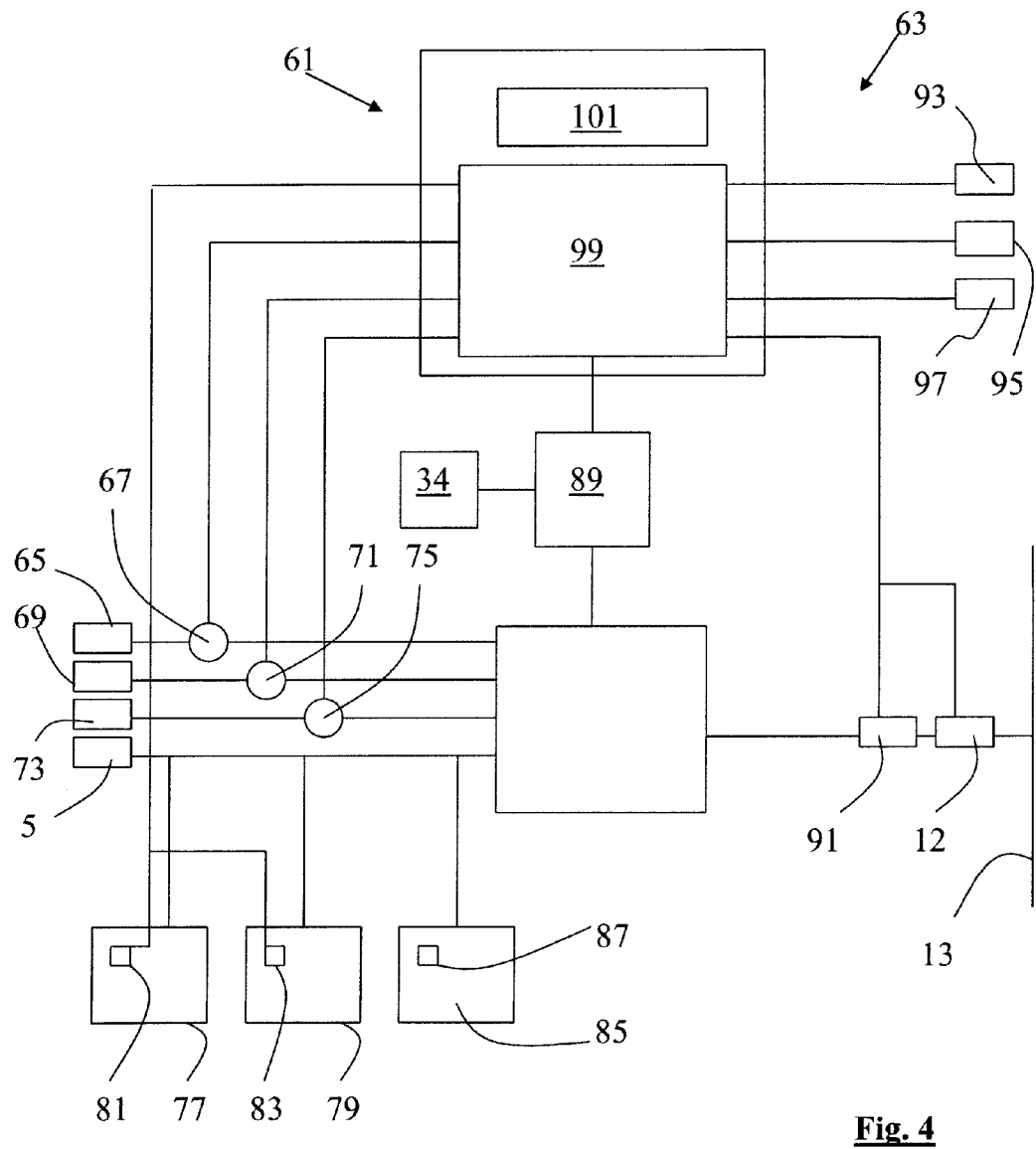
FIG. 4 is a diagrammatic representation of a load management controller in a further still alternative household electrical installation.

Referring to FIG. 4 of the drawings, there is shown a further still alternative embodiment of load management controller according to the present invention indicated generally by the reference numeral 61, for a household electrical installation 63, where like parts have been given the same reference numeral as before. In the embodiment shown, an electrical sub-circuit 65 comprises a resistive heating circuit and the load management controller operates a thyristor device 67 to vary the amount of electricity being delivered to the resistive heating circuit. An electrical sub-circuit 69 in turn comprises a switched circuit and the load management controller operates a simple on/off relay 71 intermediate the grid 13 and the electrical sub-circuit 69 to control power to the electrical sub-circuit 69. An electrical sub-circuit 73 comprising one or more variable speed pumps or fans is controlled by the load management controller with the assistance of a speed controller 75.

A dish washer 77 and clothes washing machine 79 are each provided with an internal thyristor 81, 83 respectively operable by the load management controller 61. A heat pump 85 constitutes a further electrical sub-circuit and is provided with a distributed load management controller 87 that controls the operation of that heat pump. The load management controller 87 is preferably in communication with the load management controller 61 which acts as a central load management controller for the household electrical installation. The household electrical installation further comprises a rechargeable battery bank 34 complete with charge/discharge controller and inverter 89 and there is additionally provided a current transformer 91 for sensing the amount of current being imported from the grid or exported to the grid at a given moment in time. The current transformer feeds the load management controller 61 which records the amount of electricity being delivered to or received from the grid 13. The household electrical installation comprises a plurality of sensors 93, 95, 97 which may for example be occupancy, proximity, temperature, vibration or other sensors for reporting to the load management controller to implement the electricity usage profiles of the various electrical sub-circuits. Finally, the load management controller has a central processing unit 99 that implements the electricity usage profiles and memory 101 in which tariff data is stored. Other parts of the load management controller have been omitted for clarity.

Figure 5:
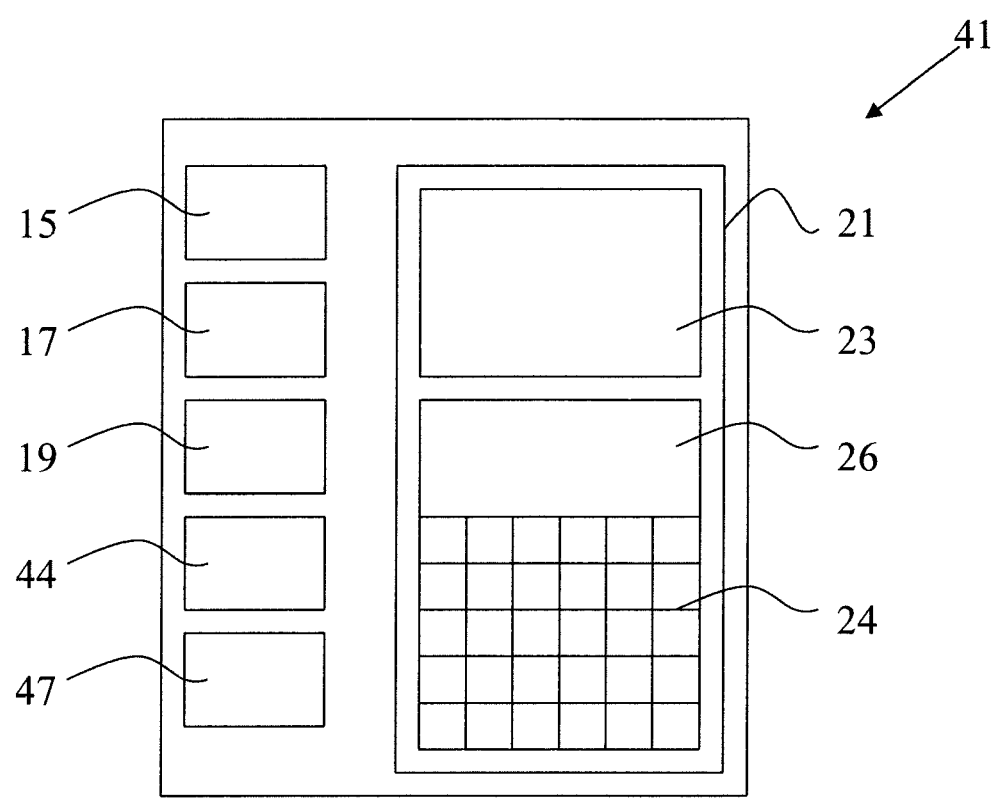
FIG. 5 is a diagrammatic representation of the components of a load management controller.

Referring to FIG. 5, there shown a schematic representation of a load management controller 41 according to the present invention. The load management controller comprises a processor 15 which can access electricity usage profiles of electrical sub-circuits (not shown) stored in memory 19. The load management controller 41 further has means 17 to control the supply of electricity to the electrical sub-circuits (not shown) in accordance with the usage profile of each of the electrical sub-circuits. The means 17 effectively comprises a device capable of communicating with switches (not shown) that control the flow of electricity to the electrical sub-circuits. The means 17 is responsive to the processor 15 and causes operation of the switches to implement the electricity usage profile.

The load management controller 41 further comprises a user interface 21 to allow programming of the electricity usage profiles in accessible memory 16. The user interface comprises a data communication port 23 and a keypad 24. The household electrical installation (not shown) may be broken down into a number of separate sub-circuits and each of those sub-circuits may be given an electricity usage profile, which is stored in the memory 19. The keypad 24 or data communication port 23 may be used to communicate with the load management controller 41 and store, update, alter or delete electricity usage profiles stored in memory 19 of the electrical sub-circuits or add new profiles for new electricity sub-circuits. Furthermore, the keypad 24 and the data communication port 23 may be used to designate certain equipment to sub-circuits.

The load management controller further comprises a receiver 44 for receiving communications from a remote electricity supply operator (not shown) and a transmitter 47 for transmitting data to a remote electricity power supply operator. Alternatively, a transceiver could be provided in place of the separate receiver 44 and transmitter 47. It is important that in certain embodiments the load management controller 41 has means to communicate with an electricity power supply operator. In this way, the load management controller can determine prices being offered for electricity stored in a static battery bank (not shown) of the household electrical installation and whether it is advantageous for the load management controller to export that stored electricity back to the grid at that time. Furthermore, it may allow the load management controller to determine whether it is worthwhile to charge the batteries in the rechargeable static battery bank at that particular moment in time due to the low cost of electricity from the grid. These communications could be made directly or via the smart meter. The data communication port 23 could comprise a simple cable port for reception of a complimentary cable or indeed could comprise a connection to a cable or other device for communication with a communication device operated by the operator of the load management controller or could be a wireless data communication port for receiving communications to and from a computing device. It would be understood the various different implementations of data communication port could be embodied or envisaged and what is important is that it is possible for an operator of the load management controller to communicate with the load management controller.

In certain instances, communications between the load management controller and the grid operator or electricity supplier may not be possible. In this case, the load management controller will have means for receiving information relating to time based tariffs and other factors that need to be taken into account when constructing optimised usage profiles. This may be done using chipped cards, on-line communications, wireless communications, manually entered data and the like.

In the embodiments described, the electricity usage profiles have been stored in memory 19 and are accessible by the processor 15 of the load management controller. It is envisaged that the electricity usage profiles may be stored remotely in a dedicated memory or may be stored in the electrical sub-circuits themselves. What is important is that the load management controller can access the electricity usage profiles and implement the profiles.

Certain components of the system are seen as important for the successful implementation of the invention. First of all, the load management controller comprises means to receive, store and process information about tariffs that apply to electricity imported into the household from the grid and electricity exported from the household to the grid. This information may be provided in the form of a schedule of time or load related charges, or any other related charges. The information may be placed in the memory of the load management controller prior to or when it is being installed and may be updated from time to time thereafter. This information may be input into the load management controller using a number of different means including a keyboard, a touch screen, a chipped card, a removable memory device and various wired or wireless communication links. This information may be provided in real-time at the time when the tariff applies or a related command is issued by means of an appropriate communications link with the supplier and/or purchaser of the electricity and/or the grid operator.

Secondly, the system further comprises means of instantaneously measuring the amount of electricity being imported into the household from the grid or being exported from the household to the grid. Where the meters installed by the grid operator are capable of making these measurements and making them available for use by the load management controller and the grid operator allows the owners of the load management controllers to make use of these measurements, they will be obtained directly from the meter by means of a suitable communications system. Where this is not possible the load management controller may alternatively use direction detecting current transformers or similar devices fitted to the cables linking the household electrical installation to the grid to make these measurements.

The load management controller can make use of additional sensors where they are available. For example, a proximity sensor for detecting if the occupants of the household are nearby, an occupancy sensor for detecting if the household is occupied, an occupancy sensor for detecting what parts of the household is occupied and a sensor for detecting if the occupants of the household are awake or asleep.

This sensor could be implemented in a number of different ways. For example, in its simplest form, this sensor could be a manually operated on/off switch beside an occupants bed. Alternatively, the sensor could be a manually operated off switch and an automatic on switch that is triggered whenever any of the lighting circuits are switched on or the internal alarm sensors activated. In a further alternative embodiment, the sensor could comprise two sensors—one monitoring the PV output (this drops to zero at night) and another monitoring the lighting circuits. The system can be set to assume the occupants are either out or asleep when the PV output is zero and all the lights are off. The sensors may consist of GPS type hand-held devices, intruder alarm type devices, car key fobs, card access control devices, passive infra-red sensors, movement detectors, vibration detectors, current transformers (on lighting circuits for example), alarm clocks, programmable timers and so on. Signals from these sensors will be communicated to the load management controller by means of suitable hard-wired and/or wireless links.

Another important aspect of the present invention is that there is a means of controlling the amount of electricity supplied to the various electrical sub-circuits including individual items of electrical equipment and elements within the individual items of equipment that are to be controlled. These will consist of on-off switching devices such as electro-mechanical, solid-state relays and the like and high-speed switching devices such as zero crossing, single cycle, burst-firing, phase angle firing and delay triggering thyristors. It is envisaged that other switching devices could be used if desired. The switches and thyristors could be located beside or in individual socket outlets and wall switches that control individual sockets and items of electrical equipment or within individual items of electrical equipment that control individual items of equipment or elements within the individual items of equipment.

It is envisaged that communications channels between the load management controller and distributed switches and thyristors could be implemented a number of different ways including individual hard-wired communications links, a hard-wired communications network, communication signals carried on mains electrical cables or communication signals carried using wireless technologies.

A further important aspect of the present invention is a means of controlling the speed of fans, pumps and heat pumps that can be usefully operated at less than full speed. These speed controllers will be used to adjust the amount of electricity supplied to these components. The speed controllers may be provided by way of dimmer/thyristor like devices that can be used to control the speed of electric motors very efficiently. They may be fitted to more and more pump, fans, chillers and the like to enable them to be slowed down during periods of low demand (low heat load, low ventilation load, low chilling load).

Another aspect of the present invention is the Charge/Discharge Control Devices and Inverters where rechargeable battery banks and/or electric vehicles with rechargeable battery supplies are connected to or from part of the household electrical installation. The load management controller has means of detecting the presence of rechargeable static battery banks and/or electric vehicles with rechargeable battery supplies that are part of the household electrical installation and where these exist the load management controller has means of measuring the state of charge of these battery banks or supplies and controlling the rate of charge or discharge of these battery banks and supplies. These will consist of suitably sized or designed charge/discharge controllers and inverters that can be used to charge rechargeable static battery banks and rechargeable battery supplies of electric vehicles using electricity drawn from the household electrical installation as and when signalled to do so and can at other times be used to draw electricity from the static battery bank and/or battery supplies and transfer it to the other household electrical installation sub-circuits by means of a suitably designed inverter. The charge/discharge control devices preferably include a charge indicator that provides the load management controller with data indicating the capacity of the static battery bank or battery supply of the electric vehicle for storing or providing power at all times.

The load management controller has a processor to use one or more of the tariff data, load data and sensor data to operate the devices controlling electricity supplied to and drawn from the various electrical sub-circuits and individual items of electrical equipment and elements within the individual items of equipment in a way that minimises the use and cost of imported electricity and maximises the value of exported electricity. This will be implemented by a suitably programmed central processor unit that receives and processes the data and sends appropriate commands to the various switching devices, charge/discharge controllers, inverters and speed controllers.

According to one aspect of the present invention, it is envisaged that thermal energy using and storing devices such as hot water heaters, towel rails, floor heaters, storage heaters, fridges, freezers (storage coolers) and the like will be used as adjustable electric loads that can be continually gradually reduced and increased to keep overall household load constantly at optimum level. Furthermore, the electrical sub-circuits may be a simple device, a group of devices or one or more components of one or more devices The present invention is in no way related to timer clocks or other devices used to pre-program the start and stop time of a central heating system or a security lighting arrangement. Furthermore, the present invention is in no way concerned with systems such as those found in hotels in which the electrical sockets or lights are only activated on the insertion of a hotel key card or like device being inserted into a complimentary holder. The invention is directed towards a far more comprehensive solution to management of the electricity usage in an entire household.

In this specification the terms, "comprise, comprised, comprises and comprising" and the terms, "include, includes, included and including" are all deemed totally interchangeable and should be afforded the widest possible interpretation. The invention is in no way limited to the embodiment here and before described but may be varied in both construction and detail within the scope of the claims.

The invention claimed is:

1. A load management controller for a household electrical installation, the household electrical installation comprising:
a plurality of electrical sub-circuits supplied by an electricity power supply, each of the electrical sub-circuits having an electricity usage profile containing rules determining the supply of electricity to the electricity sub-circuit associated therewith;
the load management controller comprising
means to access the electricity usage profiles; and
means to control supply of electricity to the electrical sub-circuits having an electricity usage profile in accordance with the rules of the electricity usage profile for that electrical sub-circuit, wherein the means to control supply of electricity to the electrical sub-circuits further comprises a high-speed switching device, responsive to the load management controller, intermediate the electricity power supply and the electrical sub-circuit having an electricity usage profile.

2. The load management controller as claimed in claim 1 in which the load management controller has accessible memory and the usage profiles are stored in load management controller accessible memory.

3. The load management controller as claimed in claim 2 in which the accessible memory is programmable and the load management controller has a user interface to allow programming of the electricity usage profiles in accessible memory.

4. The load management controller as claimed in claim 3 in which the user interface comprises a data communication port.

5. The load management controller as claimed in claim 3 in which the user interface comprises a keypad.

6. The load management controller as claimed in claim 1 in which the means to control supply of electricity to the electrical sub-circuits further comprises a controllable switch, responsive to the load management controller, intermediate the electricity power supply and the electrical sub-circuit having an electricity usage profile.

7. The load management controller as claimed in claim 1 in which the means to control supply of electricity to the electrical sub-circuits further comprises a speed controller, responsive to the load management controller, intermediate the electricity power supply and the electrical sub-circuit having an electricity usage profile.

8. The load management controller as claimed in claim 1 in which the load management controller comprises a receiver to receive data from a remote electricity power supply operator.

9. The load management controller as claimed in claim 1 in which the load management controller comprises a transmitter to transmit data to a remote electricity power supply operator.

10. The load management controller as claimed in claim 8 in which the load management controller has means to export electricity from a rechargeable battery bank onto an electricity supply grid.

11. The load management controller as claimed in claim 10 in which the load management controller exports the electricity from the rechargeable battery bank to the electricity supply grid in response to a request for electricity received from a remote electricity power supply operator.

12. The load management controller as claimed in claim 10 in which the load management controller further comprises a meter to measure the amount of electricity exported onto the electricity supply grid.

13. The load management controller as claimed in claim 1 in which the rules of the electricity usage profile for the electrical sub-circuits are one or more of time-of-day rules, activity related rules, proximity related rules, cost of electricity supply rules and operator determined rules.

14. The load management controller for a household electrical installation as claimed in claim 1 in which one of the electricity sub-circuits comprises a rechargeable static battery bank operable as an alternative power supply to the remaining electrical sub-circuits in the household electrical installation.

15. The load management controller as claimed in claim 14 comprising means to select one of the rechargeable static battery bank and a grid power supply to provide power to one or more of the remaining electrical sub-circuits.

16. The load management controller for a household electrical installation as claimed in claim 1 in which one of the electricity sub-circuits comprises a rechargeable battery bank in an electric vehicle operable as an alternative power supply to the remaining electrical sub-circuits in the household electrical installation.

17. A household electrical installation comprising:
a plurality of electrical sub-circuits supplied by an electricity power supply, each of the electrical sub-circuits having an electricity usage profile containing rules determining the supply of electricity to the electrical sub-circuit associated therewith;
a load management controller
having access to each of the electricity usage profiles,
having means to control the supply of electricity to the electricity sub-circuits in accordance with the rules of the electricity usage profile of the electrical sub-circuits, wherein the means to control supply of electricity to the electrical sub-circuits further comprises a high-speed switching device, responsive to the load management controller, intermediate the electricity power supply and the electrical sub-circuit having an electricity usage profile and in which one of the electricity sub-circuits comprises a rechargeable battery bank in an electric vehicle operable as an alternative power supply to the remaining electrical sub-circuits in the household electrical installation.

18. The household electrical installation as claimed in claim 17 in which the load management controller comprises means to select one of a rechargeable static battery bank, a rechargeable battery bank in an electric vehicle and a grid power supply to provide power to one or more of the remaining electrical sub-circuits.

19. The household electrical installation as claimed in claim 17 in which the household electrical installation has means to export electricity from a rechargeable battery bank onto an electricity supply grid.

* * * * *